United States Patent
Martinez-Minguito (10) Patent No.: US 11,218,515 B2
(45) Date of Patent: Jan. 4, 2022

(54) MEDIA PROTECTION WITHIN THE CORE NETWORK OF AN IMS NETWORK

(71) Applicant: Telefonaktiebolaget LM Ericsson (publ), Stockholm (SE)

(72) Inventor: Julio Martinez-Minguito, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 104 days.

(21) Appl. No.: 16/620,772

(22) PCT Filed: Jun. 16, 2017

(86) PCT No.: PCT/SE2017/050648
§ 371 (c)(1),
(2) Date: Dec. 9, 2019

(87) PCT Pub. No.: WO2018/231109
PCT Pub. Date: Dec. 20, 2018

(65) Prior Publication Data
US 2020/0204595 A1 Jun. 25, 2020

(51) Int. Cl.
*H04L 29/06* (2006.01)
*H04L 29/08* (2006.01)

(52) U.S. Cl.
CPC ........ *H04L 65/1016* (2013.01); *H04L 63/062* (2013.01); *H04L 63/166* (2013.01);
(Continued)

(58) Field of Classification Search
CPC ............. H04L 2209/80; H04L 63/0428; H04L 63/0464; H04L 63/06; H04L 63/062;
(Continued)

(56) References Cited

U.S. PATENT DOCUMENTS 9,241,256 B2 * 1/2016 Farthofer ................ H04W 8/10
10,063,643 B2 * 8/2018 Martin De Nicolas ......................
H04L 65/4015
(Continued)

FOREIGN PATENT DOCUMENTS

WO 2011131051 A1 10/2011
WO 2016126246 A1 8/2016

OTHER PUBLICATIONS

3GPP 3rd Generation Partnership Project; Technical Specification Group Services and System Aspects; IMS media plane security (Release 8), 3GPP TR 33.828 V1.0.0 (Mar. 2009), 56 pages.
(Continued)

*Primary Examiner* — Alina A Boutah
(74) *Attorney, Agent, or Firm* — Rothwell, Figg, Ernst & Manbeck, P.C.

(57) ABSTRACT

A method of securing media across an IP Multimedia Subsystem, IMS, network where the media transits via first and second media gateway functions of the IMS network which are controlled by respective first and second media gateway controllers acting as back-to-back Session Initiation Protocol, SIP, user agents. The method comprises sending from the first media gateway controller to the second media gateway controller, or to anode upstream of the second media gateway controller, security information of the first media gateway function, and using the sent information to secure media between the first and second media gateway functions or between the first media gateway function and said upstream node.

21 Claims, 11 Drawing Sheets (52) U.S. Cl.
CPC ........ *H04L 65/105* (2013.01); *H04L 65/1006* (2013.01); *H04L 65/1069* (2013.01); *H04L 67/141* (2013.01)

(58) Field of Classification Search
CPC . H04L 63/166; H04L 63/306; H04L 65/1006; H04L 65/1016; H04L 65/1026; H04L 65/105; H04L 65/1069; H04L 67/141; H04L 9/0838
See application file for complete search history.

(56) References Cited

U.S. PATENT DOCUMENTS

| | | | | |
|---|---|---|---|---|
| 10,637,929 | B1* | 4/2020 | Rai | H04L 65/1046 |
| 2005/0063544 | A1* | 3/2005 | Uusitalo | H04L 63/306 380/277 |
| 2009/0220091 | A1* | 9/2009 | Howard | H04L 63/306 380/277 |
| 2009/0245256 | A1* | 10/2009 | Yan | H04L 12/18 370/390 |
| 2009/0319770 | A1* | 12/2009 | Thiruvengadam | H04L 9/083 713/150 |
| 2011/0103374 | A1* | 5/2011 | Lajoie | H04L 65/4076 370/352 |
| 2011/0151869 | A1* | 6/2011 | Mahdi | H04L 65/1096 455/435.1 |
| 2012/0185600 | A1* | 7/2012 | Belling | H04L 65/1069 709/227 |
| 2012/0198527 | A1* | 8/2012 | Naslund | H04W 12/041 726/6 |
| 2012/0254403 | A1* | 10/2012 | Imbimbo | H04W 12/03 709/224 |
| 2013/0235741 | A1* | 9/2013 | Noldus | H04L 65/1016 370/252 |
| 2013/0250942 | A1* | 9/2013 | Khan | H04L 65/1073 370/352 |
| 2013/0268681 | A1* | 10/2013 | Barriga | H04L 65/1069 709/227 |
| 2014/0133397 | A1* | 5/2014 | Dahl | H04L 12/1425 370/328 |
| 2015/0026352 | A1* | 1/2015 | De Foy | H04L 67/141 709/228 |
| 2016/0105468 | A1* | 4/2016 | Mufti | H04L 65/1016 709/228 |
| 2017/0251062 | A1* | 8/2017 | Lu | G06F 21/33 |
| 2017/0339565 | A1* | 11/2017 | Dong | H04W 12/069 |
| 2018/0013880 | A1* | 1/2018 | Rao | H04M 3/2281 |
| 2018/0077001 | A1* | 3/2018 | Noldus | H04L 29/06278 |
| 2018/0184466 | A1* | 6/2018 | Rahman | H04L 12/1407 |

OTHER PUBLICATIONS

International Search Report and the Written Opinion of the International Searching Authority, issued in corresponding International Application No. PCT/SE2017/050648, dated Dec. 3, 2018, 10 pages.
3GPP, 3rd Generation Partnership Project; Technical Specification Group Services and System Aspects; IP Multimedia Subsystem (IMS) media plane security (Release 14), 3GPP TS 33.328, V14.0.0 (Mar. 2017), 71 pages.

* cited by examiner

MEDIA PROTECTION WITHIN THE CORE NETWORK OF AN IMS NETWORK

CROSS REFERENCE TO RELATED APPLICATION(S)

This application is a 35 U.S.C. § 371 National Phase Entry Application from PCT/SE2017/050648, filed Jun. 16, 2017, designating the United States, the disclosure of which is incorporated herein by reference in its entirety.

TECHNICAL FIELD

The present invention relates to a method and apparatus for establishing a secure media session in a communications network within an IP Multimedia Subsystem (IMS) network. More particularly, the invention relates to establishing a media session for transmitting media securely between two media gateway functions within an IMS network.

BACKGROUND

The Internet Protocol (IP) Multimedia Subsystem (IMS) is a well-known Third Generation Partnership Project (3GPP) standard allowing sessions to be set up between two or more parties for a broad variety of services such as voice or video call, interactive messaging sessions or third party specific applications. A few common enablers are defined by 3GPP for common usage among all these services. Examples on such enablers are capability discovery and subscribing to conference events to be used by for example an ad-hoc voice call conference for clients/devices to identify who leaves and enters the conference.

The protocol chosen by 3GPP is the Session Initiation Protocol (SIP). SIP is an application layer protocol used for controlling multimedia sessions over IP networks. It is a text based protocol which uses the request/response model. SIP defines messages sent between endpoints, which govern establishment, termination and other essential elements of a multimedia connection. SIP can be used for creating, modifying and terminating sessions consisting of one or more media streams. It can be both unicast and multicast. Examples of applications which SIP can establish and control are video conferencing, streaming multimedia distribution, instant messaging, presence information, file transfer, fax over IP and online games.

SIP provides a mechanism for the registration of user agents and for setting up multimedia sessions. The SIP REGISTER method enables the registration of a user agent's current location and the INVITE method enables the setting up of a session.

SIP does not only allow the registration of users and the set-up of connections. Modification of sessions is also possible, such as adding media to a session or new user agents joining multicast sessions such as video conferencing. In order to assist a user agent in discovering the capabilities of other user agents and events that occur within the session, a number of other SIP methods have been developed. The SIP OPTIONS method enables a user agent to query another user agent or proxy server about its capabilities. This allows a client to discover information about supported methods, content types, extensions, codecs etc. The SUBSCRIBE method is used to request asynchronous notification of an event or set of events at a later time. It is complemented by the NOTIFY command by which these notifications are enacted.

Although SIP enablers such as SUBSCRIBE and OPTIONS are powerful, they are also resource intensive and use valuable signalling bandwidth. IMS separates the control functions and the user traffic, and resource intensive methods such as those used by SIP can place a strain on resources dedicated to signalling within the IMS. For example, signalling must be routed through the home network. Acknowledgement and retransmission messages as well as provisional responses are incorporated in SIP which increase the amount of signalling required. In addition, new logic and commands for networks can only be developed through the standardisation process.

The Session Description Protocol (SDP) is used within SIP signalling to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS. The term UE is used here as it is defined by 3GPP, or evolutions thereof.

Figure 1:
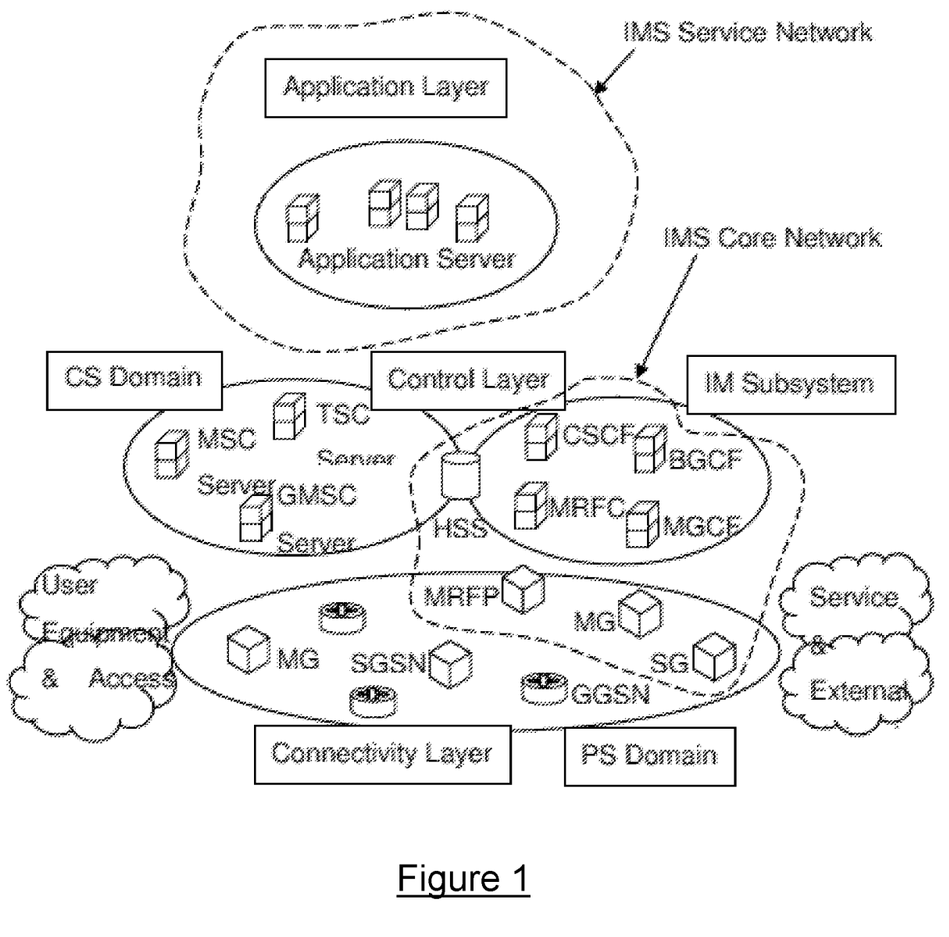
FIG. 1 illustrates schematically an IMS network integrated into a communications system comprising a 3G network.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Figure 2:
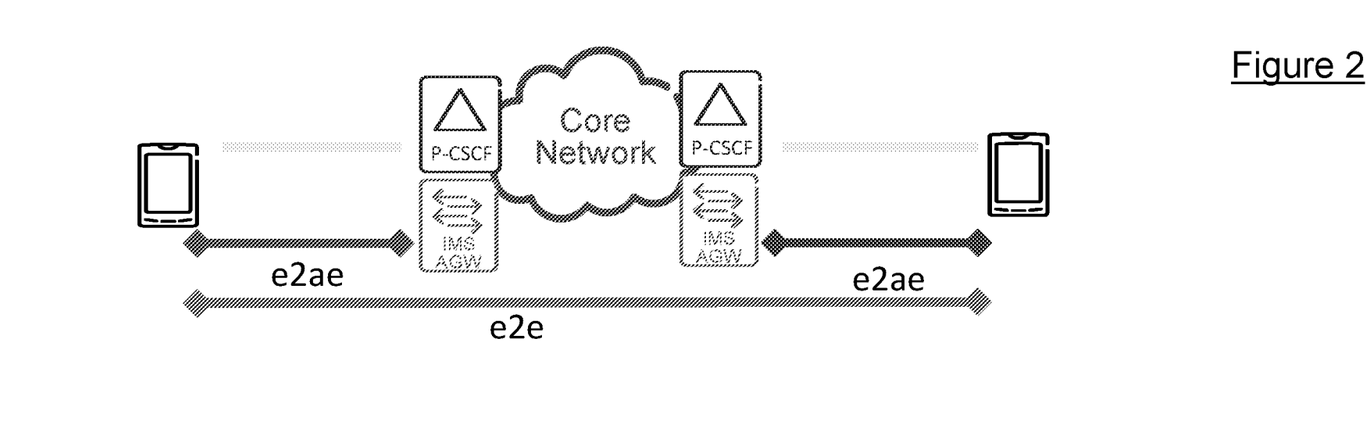
FIG. 2 illustrates schematically a known system providing access network media protection.

When the access networks are not trusted, media protection can be negotiated to ensure secure transmission of media: (1) from terminal to the access edge of the network (e2ae), i.e. from a user device to an access gateway of the IMS, thereby protecting only the access segment; or (2) "end to end" (e2e) to protect the media from the originating terminal, all the way to the terminating terminal. These two cases are illustrated in FIG. 2.

The capabilities of the terminals are indicated during the SIP registration, and the networks may have policies for which methods are supported. Whilst it is usual for the access networks to be untrusted, the core network is often assumed to be trusted, making media protection within this part of the network unnecessary. However, with the deployment of telecommunication networks in cloud environments, operators of the media services may no longer be in control of the core infrastructure. Instead, control of a portion of, or indeed the whole of, the core network and its architecture may be delegated to third parties. As a consequence, the core network may not be trusted for transmission of media. For example, media transmitted over the core network may be vulnerable to eavesdropping or man-in-the-middle attacks, i.e. the privacy, integrity or authenticity of the media cannot be guaranteed.

It is therefore desirable that protection for media be provided in order to provide users of the IMS network with assurance that their media communications remain authentic and/or confidential. In some circumstances, end-to-end protection (e2e) of the media may be appropriate; however, this type of protection may hinder, or be incompatible with, some important network functionalities. For example, media transcoding may not be possible with e2e protection, which is problematic for transmission of media over networks which use different codecs. Lawful Interception of the protected media by law enforcement agencies, which may be a legal requirement in some jurisdictions, may also not be possible when e2e protection is used.

SUMMARY

According to a first aspect of the present invention there is provided a method of securing media across an IP Multimedia Subsystem, IMS, network where the media transits via first and second media gateway functions of the IMS network which are controlled by respective first and second media gateway controllers acting as back-to-back Session Initiation Protocol, SIP, user agents. The method comprises sending from the first media gateway controller to the second media gateway controller, or to a node upstream of the second media gateway controller, security information of the first media gateway function, and using the sent information to secure media between the first and second media gateway functions or between the first media gateway function and said upstream node.

The term "Media gateway controller" as used here encompasses nodes including, but not limited to; P-CSCF, IMS-ALG, IBCF, MGCF, and MRFC. Similarly, the term "media gateway function" encompasses nodes including, but not limited to; BGF, IMS AGW, TrGW, and MRFP The method may comprise, at the first media gateway controller, receiving, from the second media gateway controller, further security information of the second media gateway function or said upstream node and using the further security information to secure media between the first and second media gateway functions or between the first media gateway function and said upstream node. The security information and the further security information is used to negotiate one or more encryption keys and using the key(s) to secure the media.

By way of example, the key negotiation may use a Session Description Security Descriptions, SDES, protocol or a Datagram Transport Layer Security, DTLS, protocol.

The method may comprise, at the first media gateway function, receiving media secured using the security information of the first media gateway from the second media gateway function or said upstream node and removing the security from the received media.

By way of example, the first and/or second media gateway controller may be a Proxy Call Session Control Function, P-CSCF, an Interconnection Border Control Function, IBCF, or a Media Gateway Control Function, MGCF.

Where the method involves said upstream node, the second media gateway controller may be a Media Resource Function Controller, MRFC and said upstream node may be a Media Resource Function Processor, MRFP.

Where the method involves said upstream node, said upstream node may be a User Equipment, UE.

By way of example, the security information of the first media gateway function may be sent in a SIP INVITE or SIP UPDATE message. The further security information may be sent in a SIP 18x series or a SIP 200 response message.

The method may comprise receiving, at the second media gateway controller, from the first media gateway controller, the security information of the first media gateway function and data indicating which of the second media gateway function or said upstream node should be sent the security information. The method may further comprise, at the second media gateway controller, obtaining the further security information from either the second media gateway function or said upstream node according to said indicator.

According to a second aspect of the present invention there is be provided an apparatus configured to operate as a media gateway controller acting as a back-to-back Session Initiation Protocol, SIP, user agent controlling a media gateway function of an IP Multimedia Subsystem, IMS, network. The apparatus comprises processor circuitry, a storage unit storing instructions executable by the processor circuitry, a receiver for receiving messages and a transmitter for sending messages, whereby the apparatus is operable to:
  send security information of the media gateway function to another media gateway controller acting as a back-to-back SIP user agent controlling another media gateway function of the IMS network, or to a node upstream of the other media gateway controller; and
  configure the media gateway function to remove the security from media secured using the security information received from the other media gateway function or upstream node.

The apparatus may be operable to receive security information of the other media gateway function or said upstream node, send the security information to the media gateway function, and configure the media gateway function to secure media using the security information for sending to the other media gateway function or said upstream node.

The apparatus may be operable to send the security information to the media gateway function in response to receiving an 18x series answer containing the security information.

According to a third aspect of the present invention there is be provided an apparatus configured to operate as a media gateway controller acting as a back-to-back Session Initiation Protocol, SIP, user agent controlling a media gateway function of an IP Multimedia Subsystem, IMS, network. The apparatus comprises processor circuitry, a storage unit storing instructions executable by the processor circuitry, a receiver for receiving messages and a transmitter for sending messages, whereby the apparatus is operable to:
  receive security information of another media gateway function of the IMS network controlled by a media gateway controller acting as a back-to-back SIP user agent;
  send the security information to either the media gateway function or to a node upstream of the media gateway controller; and
  configure the media gateway function or a node upstream of the media gateway controller to use the security information to secure media for sending to the media gateway.

The apparatus may be operable to send the security information in response to receiving a SIP INVITE or SIP UPDATE containing the security information. The apparatus may also be operable to receive an indicator specifying which of the second media gateway function or said upstream node to send the security information, and send the security information to the second media gateway function or said upstream node according to said indicator.

The apparatus may be operable to obtain security information from either the media gateway function or the node upstream of the media gateway controller according to said indicator and send the obtained security information to the other media gateway function.

The apparatus may be configured to operate as a Proxy Call Session Control Function, P-CSCF, an Interconnection Border Control Function, IBCF, a Media Resource Function Controller, MRFC, or a Media Gateway Control Function, MGCF.

DETAILED DESCRIPTION

Embodiments will now be described more fully below with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Figure 3:
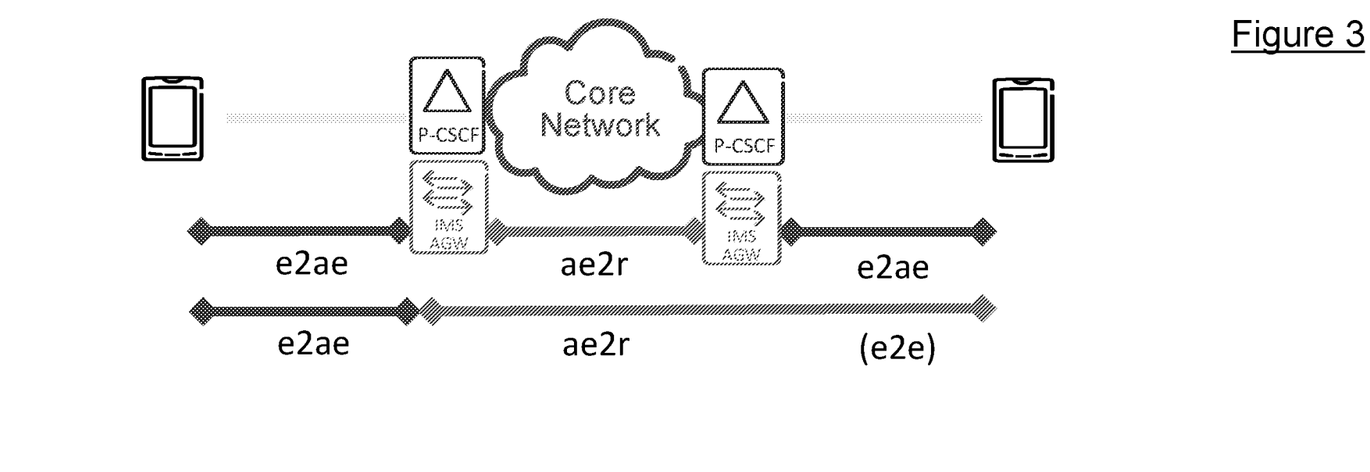
FIG. 3 illustrates schematically a system for core IMS network media protection according to an embodiment of the present invention.

In order to address the problems discussed above, the present invention provides protection of media transmitted across the core network which is separate from the media protection provided for by the access networks. FIG. 3 shows schematically a system which provides two ways of implementing this type of media protection. In this example, the system comprises two P-CSCFs, each controlling an Access Gateway (AGW) of an IMS comprising an untrusted core network. In use, an originating UE connects to one of the P-CSCFs over an access network in order to establish a media session with a terminating UE, connected to the other P-CSCF. The UEs then connect via one or both of the AGWs to establish a media session, i.e. the AGWs provide an access edge of the core network.

As discussed in more detail below, media protection may, in general, refer to methods for ensuring that the media is transmitted securely between two parts of the network, without an unauthorised party being able to, for example, access or modify the media. For example, media may be protected by encryption, using for example a symmetric encryption technique such as Secure Real-Time Transport Protocol, of the media. Other encryption techniques may also be used of course including asymmetric techniques (e.g. involving the use of public-private key pairs).

In the first use case (shown in the upper scheme in FIG. 3), the media is protected piecewise across the network from:

originating UE to originating network access edge (e2ae);

originating network access edge to terminating network access edge, i.e. protection in the core network, from "access edge to remote" (ae2r); and terminating network access edge to terminating UE (e2ae).

When the media is protected using encryption, the media can be decrypted in the originating access edge, by a Border Gateway Function (BGF) for example, where network functions such as transcoding and Lawful Intercept can be performed if needed. As the BGF are under the control of the operator providing the media service, these network functions can be performed without the need to expose the decrypted media to the core network. The media is subsequently encrypted again before transmission via the core network. The same operations may be performed on the terminating access edge. As a result, all media can be protected during transit with encryption, whilst the network can still perform needed functionality on the media.

In the second use case (shown in the lower scheme of FIG. 3), the media is protected from: originating UE to originating network access edge (e2ae), and then from terminating network access edge to terminating UE (ae2r). This use case may be selected when one of the UE supports e2ae and the other UE supports e2e encryption, the end-to-end protection in this case being terminated in the access edge instead of the remote UE.

Figure 4:
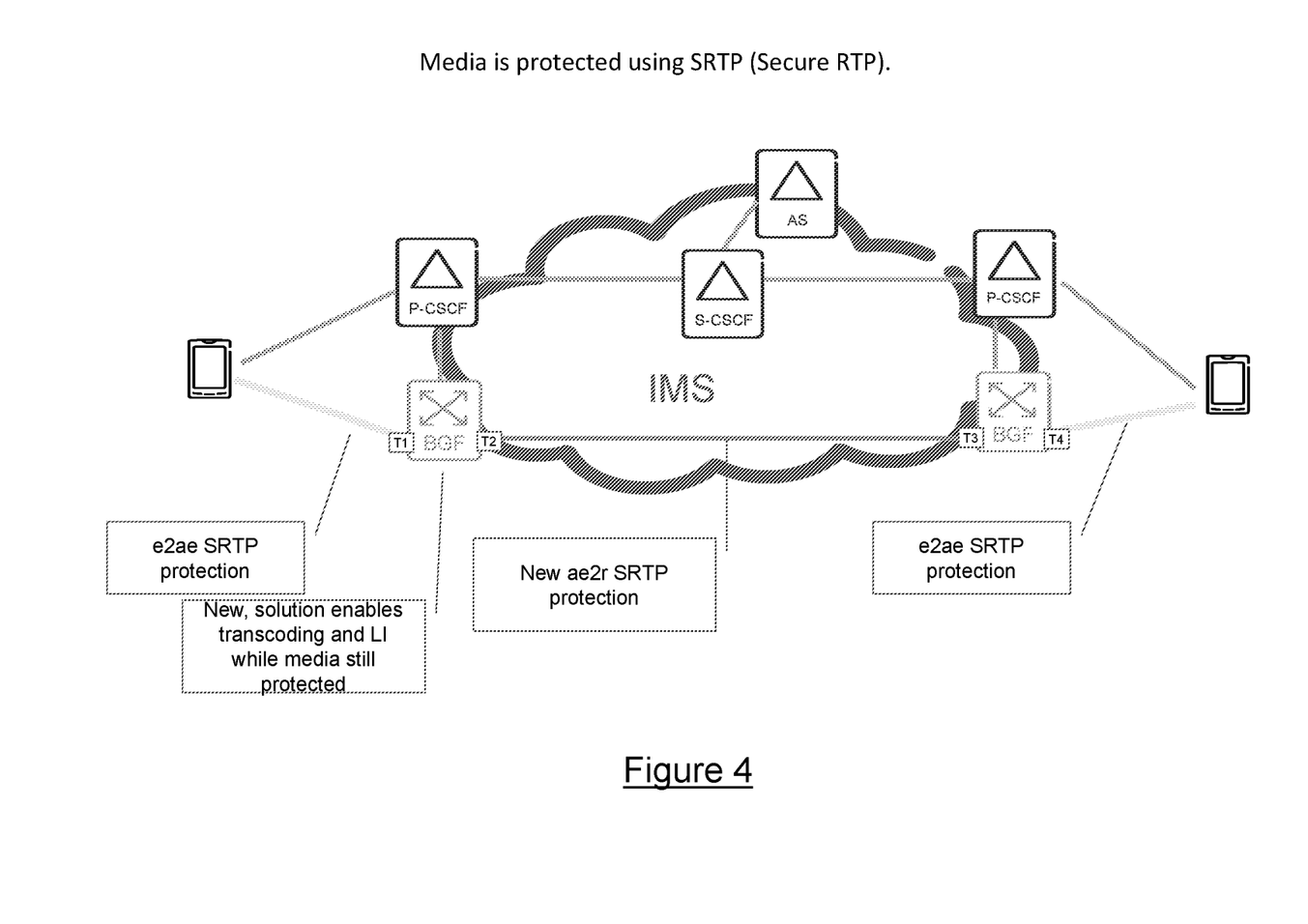
FIG. 4 illustrates schematically the system of FIG. 3 in more detail.

FIG. 4 illustrates the system in FIG. 3 in more detail. The two P-CSCFs in the signalling plane of the IMS core network communicate via an S-CSCF, which is allocated to handle the signalling to/from the UEs and which may provide services to the UEs using an Application Server (AS). As discussed above, the AGWs each comprise a BGF, which is used to convert between the forms of media protection used for each of the access and core networks. For example, the BGF of the originating network access edge provides a termination point, T1, at which the e2ae protection is removed from the media. At another termination point of the BGF, T2, the ae2r protection is applied so that the media can be transmitted securely across the core network to the BGF terminating network access edge. Here, the ae2r protection is removed at a termination point, T3, before e2ae protection is then applied for transmission of the media to the terminating UE. The media protection at each stage may, for example, make use of the Secure Real-Time Transport Protocol (SRTP) in order to guarantee integrity and confidentiality of media data exchanged by the UEs.

Figure 5:
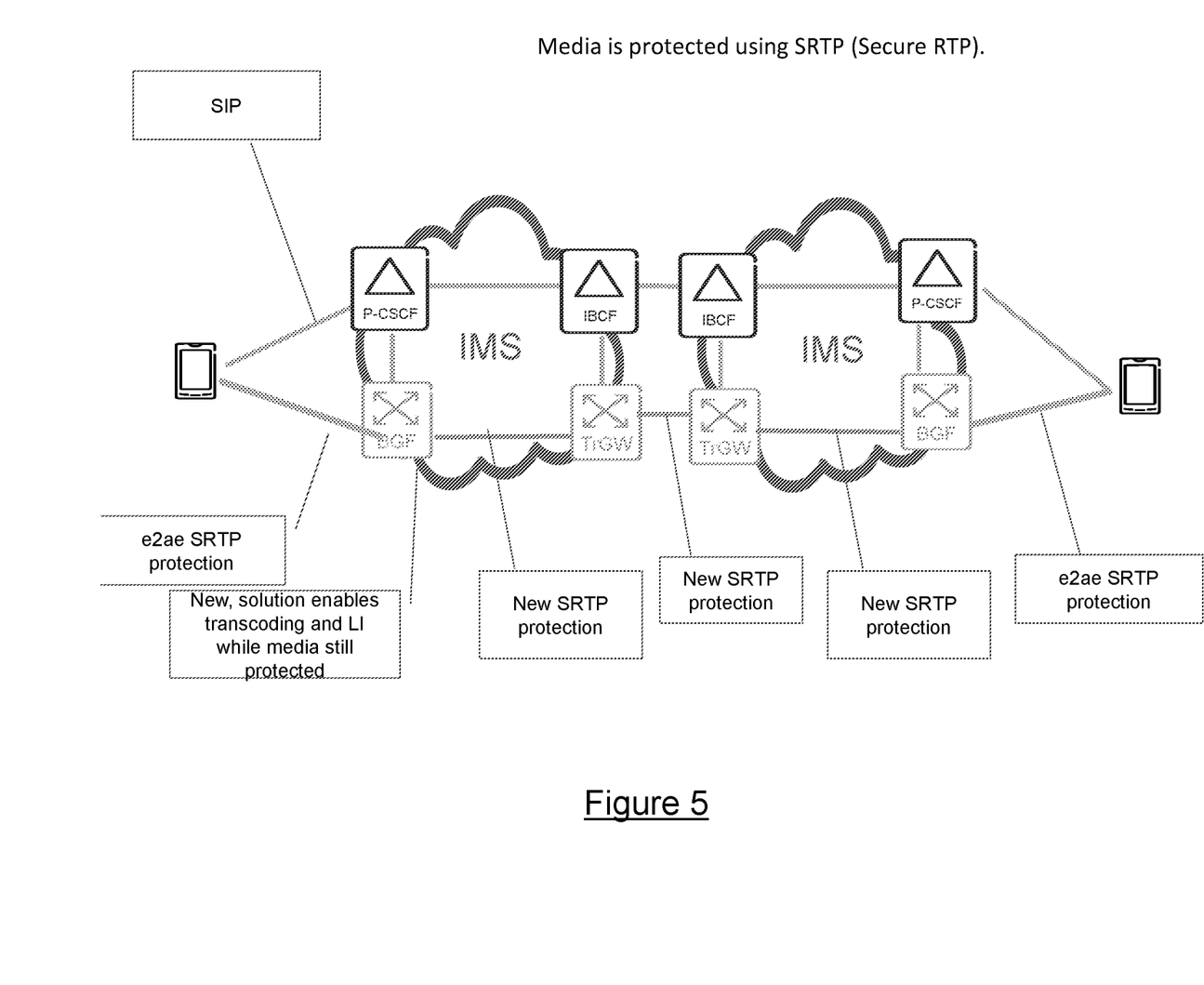
FIG. 5 illustrates schematically a system for core IMS network media protection in the case where there are two core IMS networks.

FIG. 5 illustrates schematically how the system of FIGS. 3 and 4 can be extended for use when there are two core IMS networks. A similar approach can of course be used when there are three or more core IMS networks. In this example, the core networks are joined in the signalling plane by respective Interconnection Border Control Functions, IBCFs, and in the media plane by respective Transition Gateways, TrGWs. The media is protected as it is transmitted between the TrGWs, i.e. media transmitted securely across one of the core networks is de-protected by the TrGW at the network edge and subsequently protected for transmission to the other TrGW, which de-protects the media and then applies protection suitable for transmission of the media across the other core network.

Figure 6:
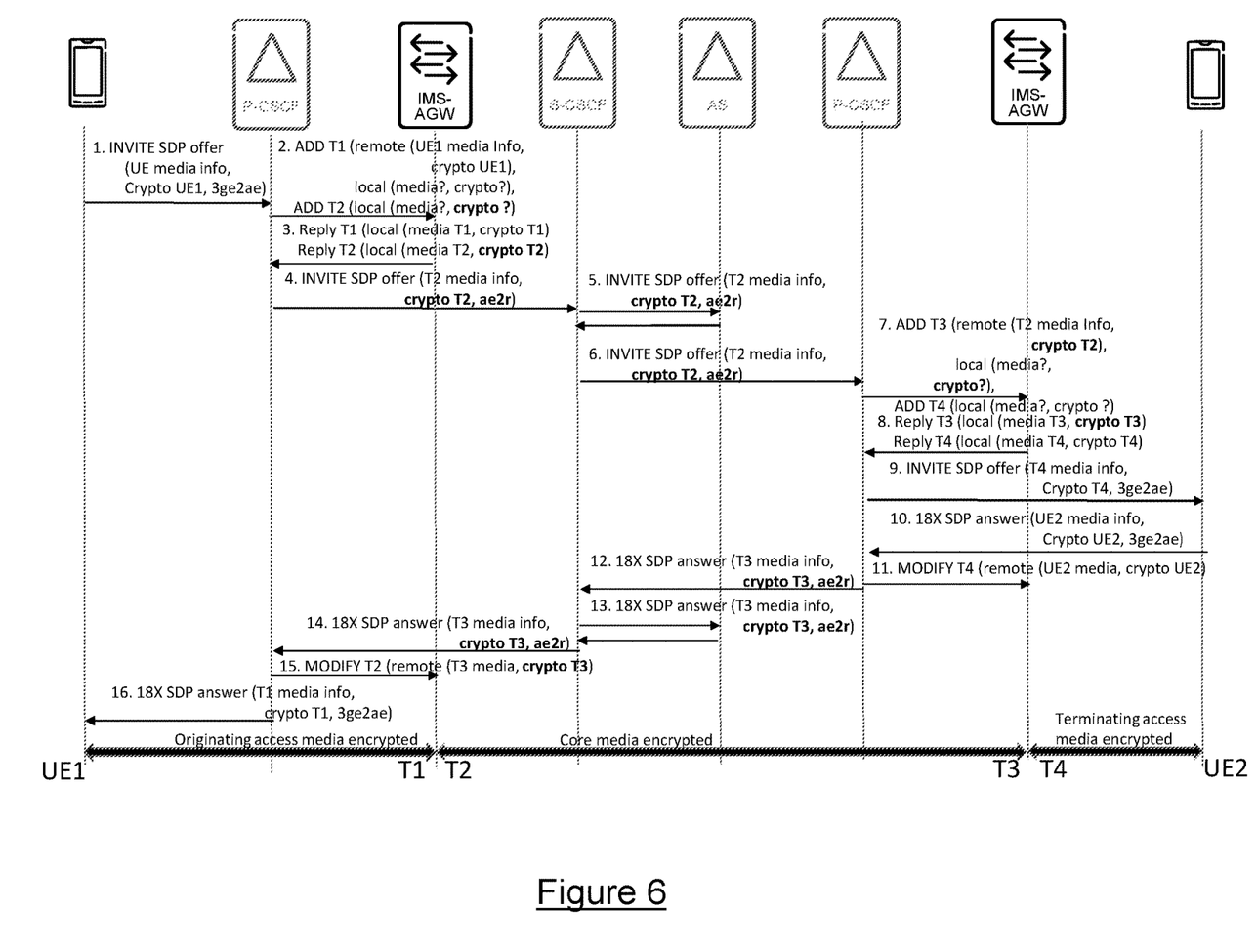
FIG. 6 shows signalling associated with a procedure for establishing a secure media session between two UEs.

FIG. 6 illustrates a signalling flow sequence associated with configuring the IMS to support media encryption within the core IMS network. In this example, the signalling is based on the Session Initiation Protocol (SIP). The basic commands used to set up a media session are the REGISTER method and the INVITE method. The REGISTER method allows a user agent to register its location with a registrar server. The INVITE method is the method by which a session is established with another user agent. Other methods in support of these basic commands include the acknowledgement response (ACK), the CANCEL request, and the BYE request to end participation in a session.

Step 1 is a standard procedure in which an originating UE sends a SIP INVITE to a P-CSCF in order to establish a media session. The SIP INVITE message contains Session Description Protocol (SDP) fields which indicate parameters associated with the media session and cryptographic information (crypto UE), such as a public encryption key for the UE or a reference to such a key, which is necessary to establish secure communication from the IMS to the UE over the access network (3g2ae).

In step 2, the P-CSCF sends a pair of SIP REQUESTs to an IMS access gateway (IMS-AGW) to request that the IMS-AGW add an access termination (T1) for communication between the UE and the IMS-AGW, and a core media termination (T2) for communication to/from the IMS-AGW across the IMS core network. In both ADD requests, the P-CSCF also requests encryption capabilities be reserved at the IMS-AGW to allow media to be communicated securely to each termination (T1, T2). In response, step 3, the IMS-AGW sends a pair of REPLY messages to the P-CSCF: each message contains local media parameters for the IMS-AGW and cryptographic information, e.g. a public key, for the one of the terminations (T1, T2).

In step 4, the P-CSCF indicates toward the IMS core a request to encrypt the core media using the encryption key of the core media termination (T2). This is done by the P-CSCF sending a SIP INVITE to the S-CSCF to establish a media session originating at the termination (T2). The SDP fields of the SIP INVITE include parameters associated with the media session, the encryption key for T2 and a new indicator "ae2r" which indicates the need for encryption of the core media whilst explicitly indicating that the media protection is not e2e. The SIP INVITE is then forwarded by the S-CSCF (step 5), via an Application Server (AS) (step 6), to a second P-CSCF. This P-CSCF then transmits a pair of ADD requests to a second IMS-AGW in order to set up a core media termination (T3) and an access termination (T4) in the second IMS-AGW (step 7). The request for the new core media termination (T3) includes the encryption key (or a reference to the encryption key) for T2, which is then stored by the IMS-AGW so that the new core media termination can encrypt media which is to be received by T2. In step 8, cryptographic information for the terminations (T3, T4) is returned to the P-CSCF.

In step 9, a SIP INVITE is sent from the P-CSCF to a terminating UE in order to establish a media session between the access termination (T4) and the terminating UE. The SDP fields of the SIP INVITE message indicate media information of the access termination (T4), together with cryptographic information to enable the terminating UE to transmit media securely to the access termination over the access network (as designated by the indicator "3g2ae" included in the invite message). The terminating UE responds, via an SDP answer (step 10), with its own media and cryptographic information. The P-CSCF then sends a MODIFY request to the second IMS-AGW so that the access termination (T4) can be configured to use the media information and cryptographic information of the terminating UE.

In steps 12 to 14, the second P-CSCF sends an 18x series answer message to the first P-CSCF (step 14), via the S-CSCF (step 12) and the AS (step 13). The SDP fields of the answer message contain the media information and cryptographic information of the core termination (T3), together with the new indicator "ae2r" to indicate the need for encryption of the core media. The P-CSCF then sends (step 15) a MODIFY request to the first IMS-AGW so that the core termination (T2) can be configured to use the media information and cryptographic information of the core termination (T3) at the second IMS-AGW. The first P-CSCF also sends (step 16) a SIP answer message to the originating UE containing the media information and cryptographic information for the access termination (T1) of the first IMS-AGW.

Step 16 completes the media anchoring so that media can be transmitted between the originating and terminating UEs whilst remaining encrypted as it traverses both the access networks (a2ae encryption) and the core IMS network (ae2r encryption). For example, the originating UE encrypts media using the key negotiated with the access termination (T1) in the first IMS-AGW. The encrypted media is then transmitted via the access network of the first UE to the IMS-AGW, where it is decrypted and then re-encrypted using the key negotiated with the core termination (T3) in the second IMS-AGW. The encrypted media is then transmitted via the IMS core network to the second IMS-AGW where it is decrypted at core termination (T3) and then re-encrypted using the key negotiated with the terminating UE. Finally, the encrypted media is sent over the access network of the terminating UE and then decrypted by the terminating UE. A similar process occurs when encrypted media is sent from the terminating UE to the originating UE using the keys negotiated for each segment to ensure that the media remains encrypted as it moves between untrusted network entities.

Figure 7:
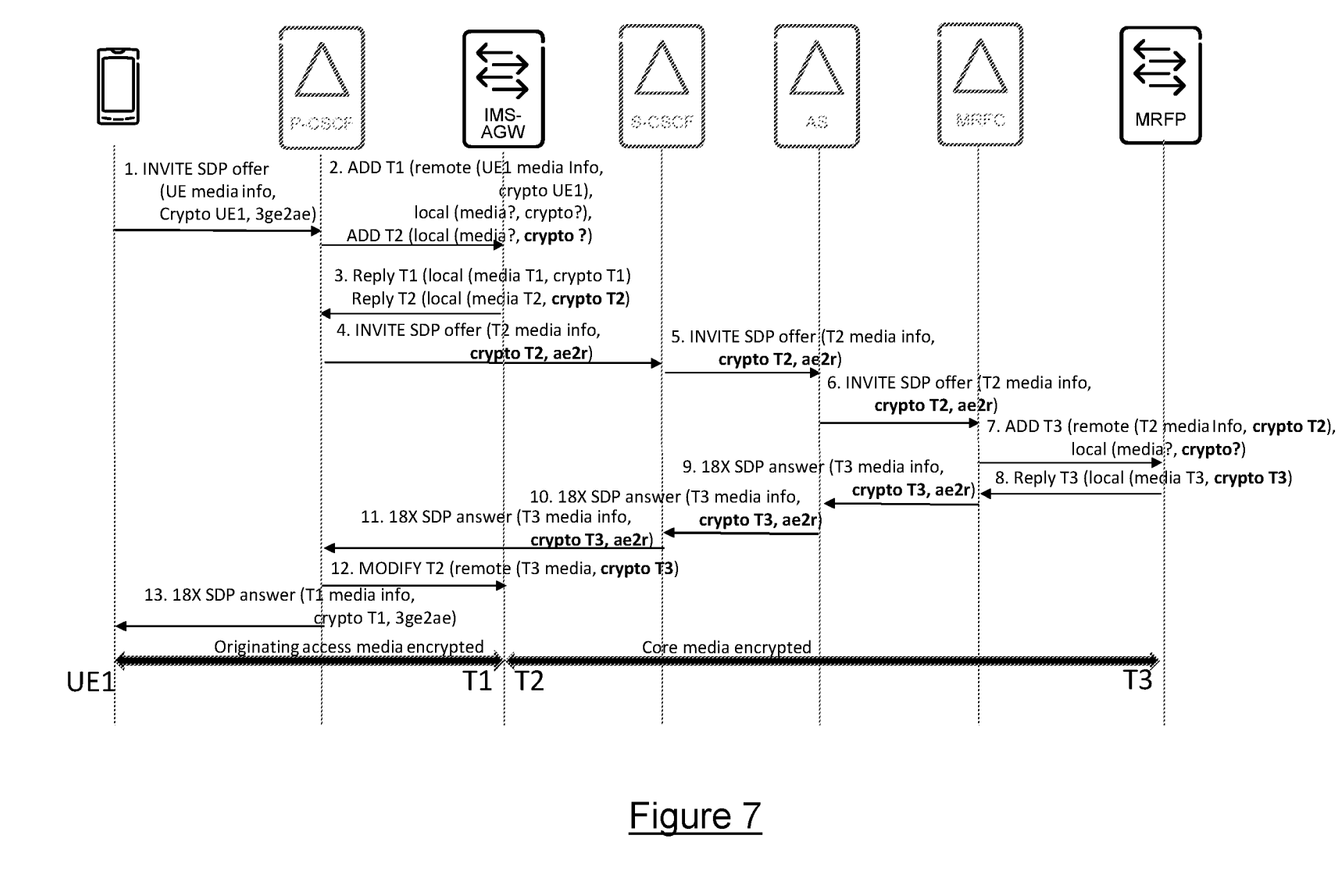
FIG. 7 shows signalling associated with a procedure for establishing a secure media session between a UE and a Media Resource Function, MRF.

FIG. 7 shows signaling for establishing a secure media session between a UE and a Media Resource Function Processor (MRFP), rather than a terminating UE as in FIG. 6. In this example, a Media Resource Function Controller (MRFC) takes the place of one of the P-CSCFs. A second IMS-AGW is not needed as a media session can be established directly between the MRFP and the IMS-AGW to which the UE is connected. The signaling is similar to that in FIG. 6 except that only a single termination (T3) is established in the MFRP in order for the MFRP to communicate securely with the IMS-AGW.

Figure 8:
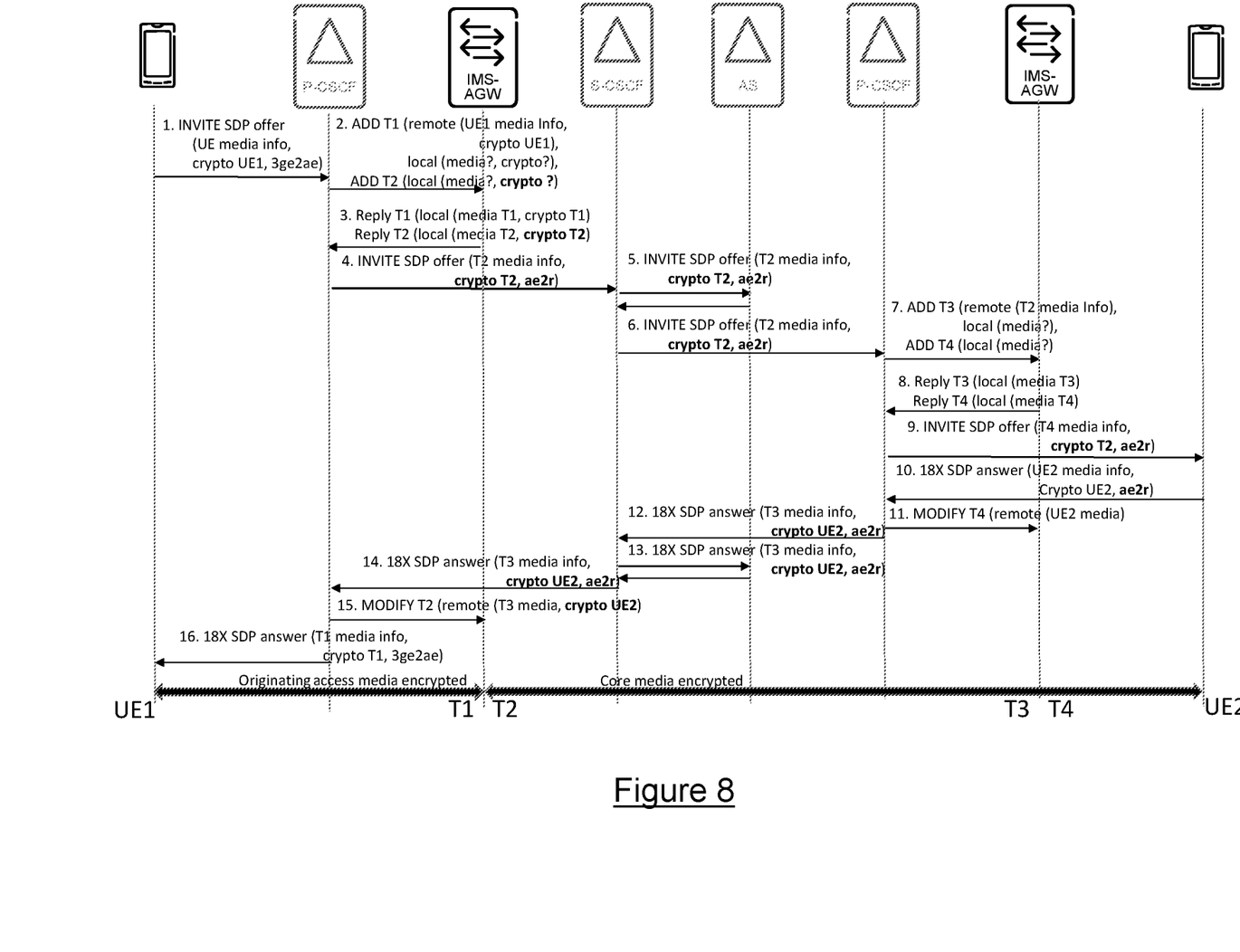
FIG. 8 shows signalling associated with an alternative procedure for establishing a secure media session between two UEs.

FIG. 8 shows signaling for establishing a secure media session between two UEs, in which the terminating UE requested e2e protection, as already discussed above in relation to FIG. 3. In this example, steps 1 to 6 are identical to those of FIG. 6. In steps 7 and 8, terminations T3 and T4 are set up at the second IMS-AGW without encryption capabilities. In step 9, the SIP INVITE is sent from the P-CSCF to the terminating UE with the encryption key for termination T2 to enable the terminating UE to transmit media securely to the first IMS-AGW across both its access network and the core network. At step 10, the terminating UE sends an SDP answer to the second P-CSCF with its own media and cryptographic information. The P-CSCF then sends, in step 11, a MODIFY request to the second IMS-AGW so that the access termination (T4) can be configured to use the media information of the terminating UE. Steps 12 to 16 are equivalent to those of FIG. 6, except that the cryptographic information of the terminating UE is sent in place of any cryptographic information for termination T3.

In the examples above, the cryptographic protection is negotiated using Session Description Security Descriptions (SDES), but the same principles can be used when negotiating keys using the Datagram Transport Layer Security/Secure Real-Time Transport Protocol (DTLS/SRTP).

Figure 9:
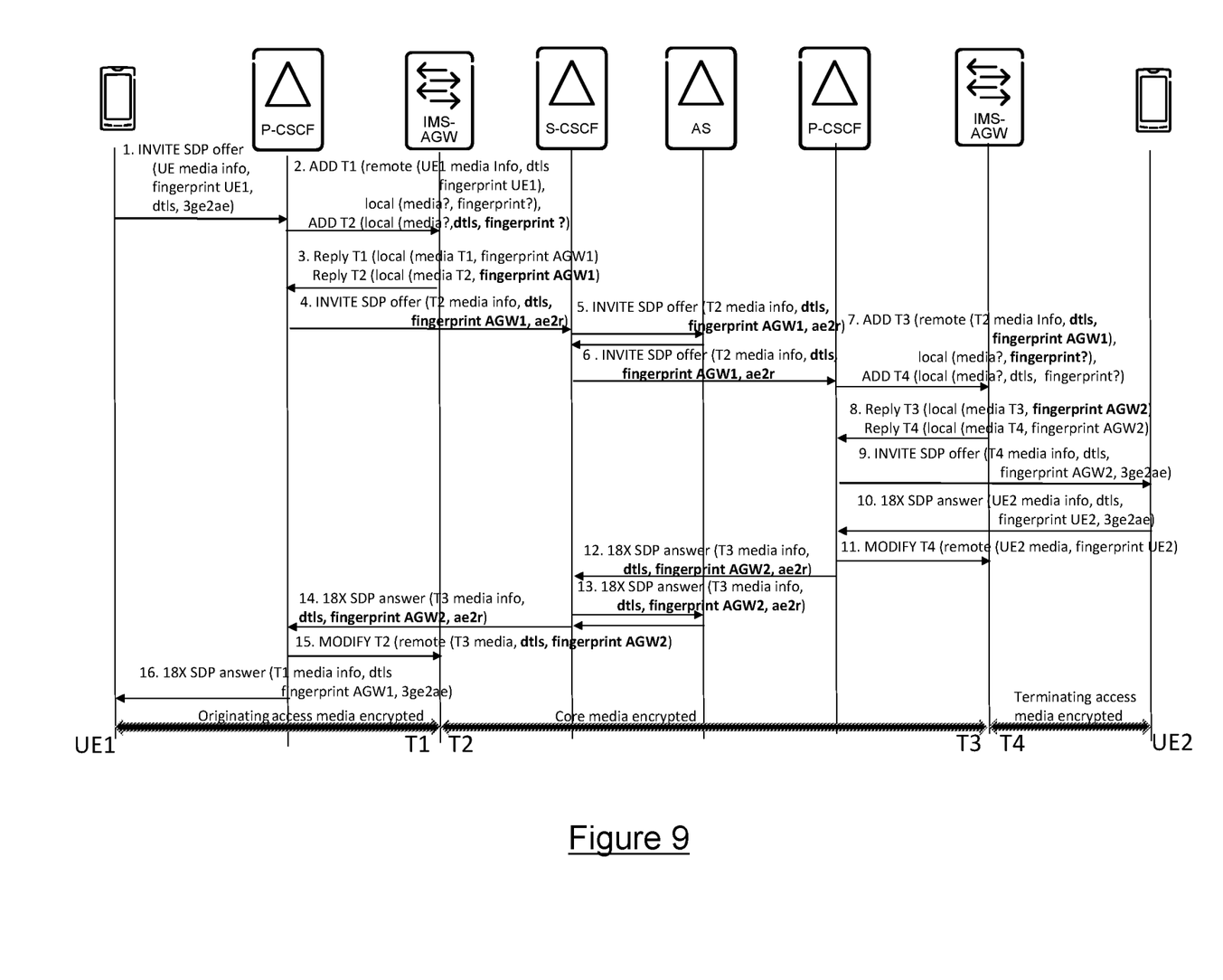
FIG. 9 shows signalling associated with a procedure for establishing a secure media session between two UEs.

FIG. 9 shows signaling which uses DTLS to establish a secure media session between two UEs. Steps 1 to 11 are similar to those of FIG. 6, except that the messages sent between the devices include a fingerprint (taken across certificates used in the DTLS negotiation in the media plane), in place of cryptographic information, together with an indicator "dtls" (in reality "UDP/TLS/RTP/SAVP") that key negotiation should use DTLS. For example, in step 9, the terminating P-CSCF (P-CSCF term) sends an INVITE to the terminating UE (UE2) which includes the fingerprint of the terminating IMS-AGW (IMS-AGW term). In response, the UE2 sends an SDP answer which includes its own fingerprint to the P-CSCF (step 10), which then transmits the fingerprint to the terminating IMS-AGW (step 11). The exchanged fingerprints are used to validate the certificates used by the UE and the IMS-AGW during the DTLS negotiation of the keys to be used for the SRTP sessions.

Similarly, steps 12-16 complete the fingerprint exchanges necessary to validate the DTLS negotiation of the keys for the SRTP connection between the originating and terminating IMS-AGWs (step 15) and between the originating UE and originating IMS-AGW (step 16).

Figure 10:
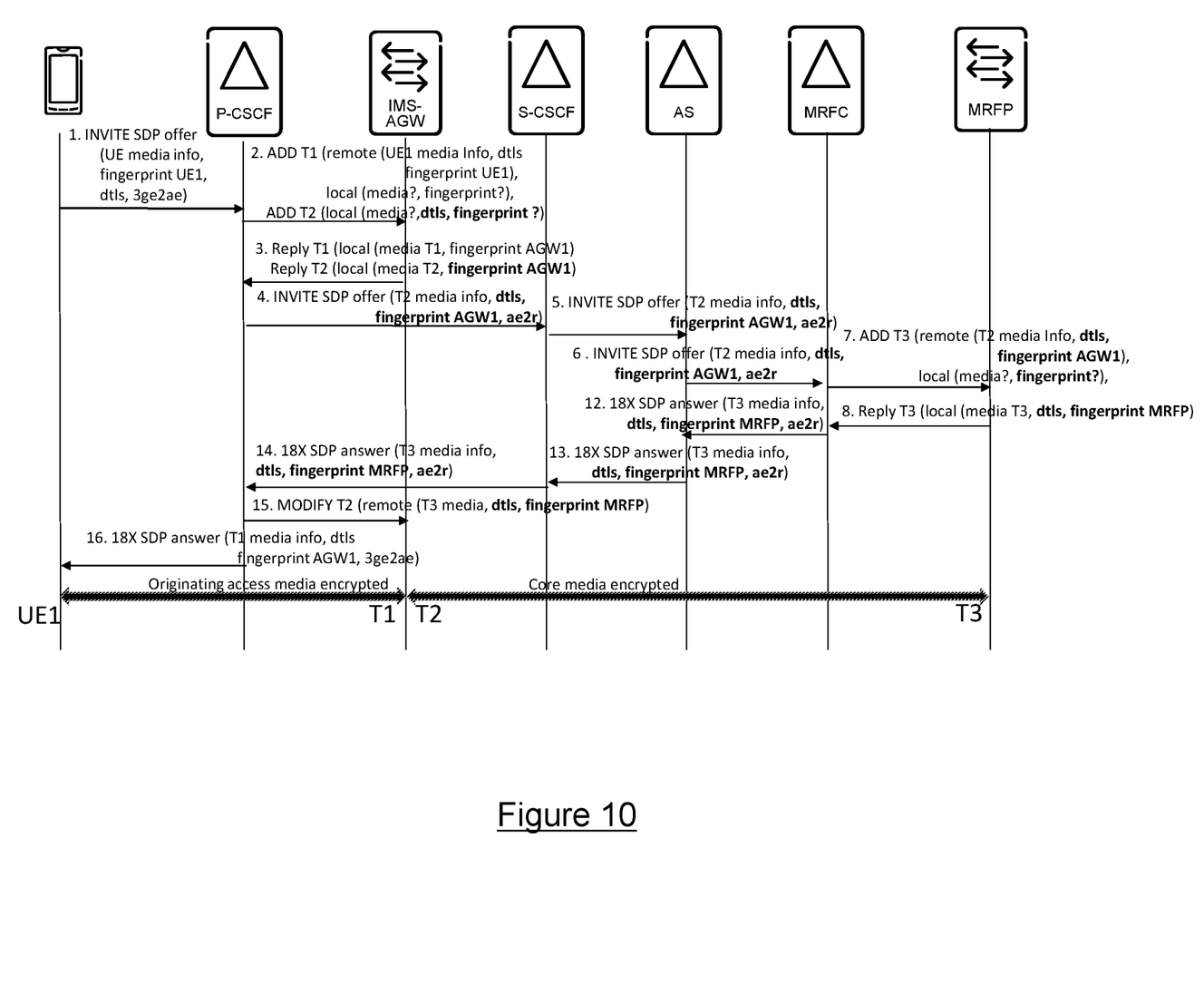
FIG. 10 shows signalling associated with a procedure for establishing a secure media session between a UE and a Media Resource Function, MRF.

FIG. 10 shows signaling which uses DTLS to establish a secure media session between a UE and a Media Resource Function, MRF.

Figure 11:
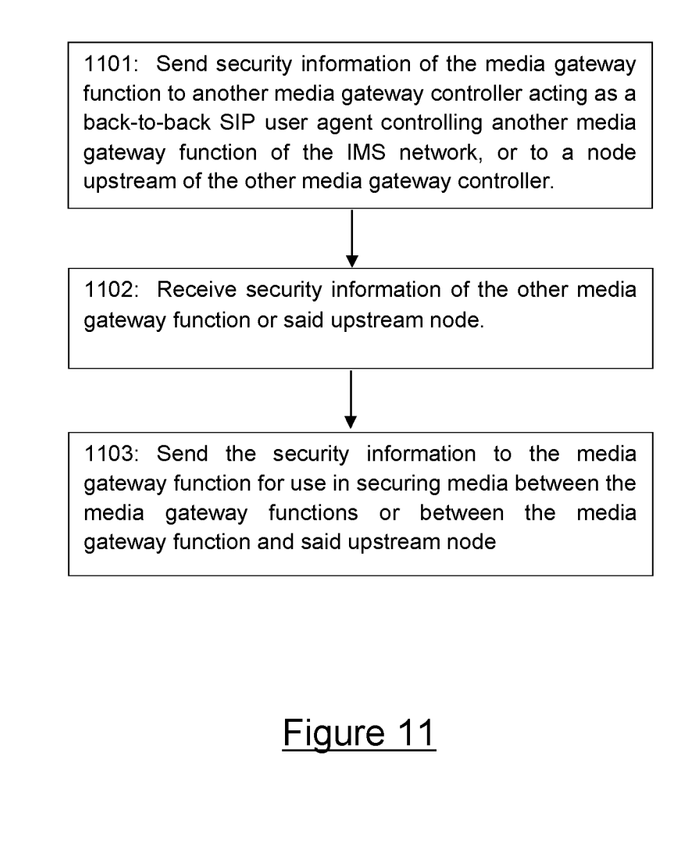
FIG. 11 is a flow diagram illustrating a method carried out by a back-to-back user agent of an IMS network.

FIG. 11 is a flow diagram illustrating a method carried out by an apparatus configured to operate as a media gateway controller acting as a back-to-back SIP user agent controlling a media gateway function of an IMS network. In step 1101, the apparatus sends security information of the media gateway function to another media gateway controller acting as a back-to-back SIP user agent controlling another media gateway function of the IMS network, or to a node upstream of the other media gateway controller. In step 1102, the apparatus receives security information of the other media gateway function or said upstream node. In step 1103, the apparatus sends the security information to the media gateway function for use in securing media between the media gateway functions or between the media gateway function and said upstream node.

Figure 12:
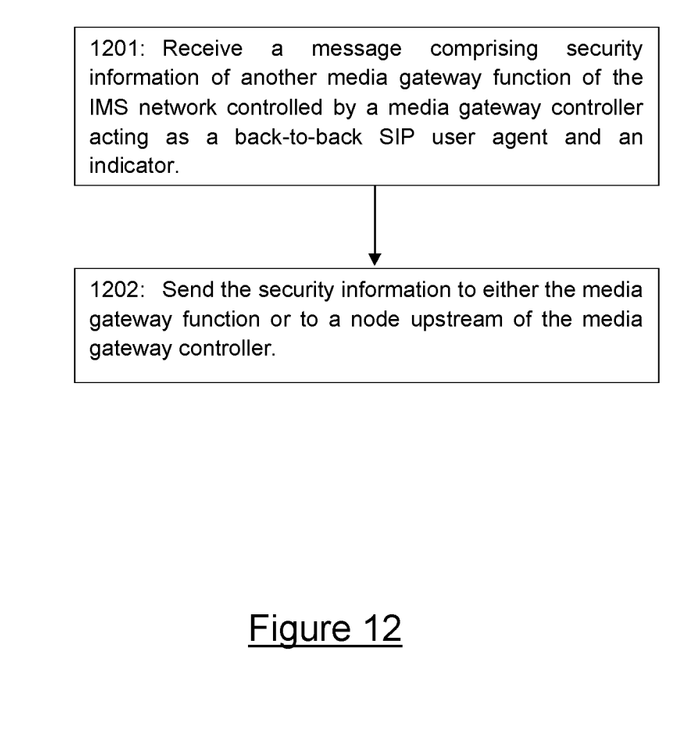
FIG. 12 is a flow diagram illustrating a method carried out by a back-to-back user agent of an IMS network.

FIG. 12 is a flow diagram illustrating a method carried out by an apparatus configured to operate as a media gateway controller acting as a back-to-back SIP user agent controlling a media gateway function of an IMS network. In step 1201, Receive a message comprising security information of another media gateway function of the IMS network controlled by a media gateway controller acting as a back-to-back SIP user agent and an indicator. The apparatus then sends (step 1202) the security information to either the media gateway function or to a node upstream of the media gateway controller.

Figure 13:
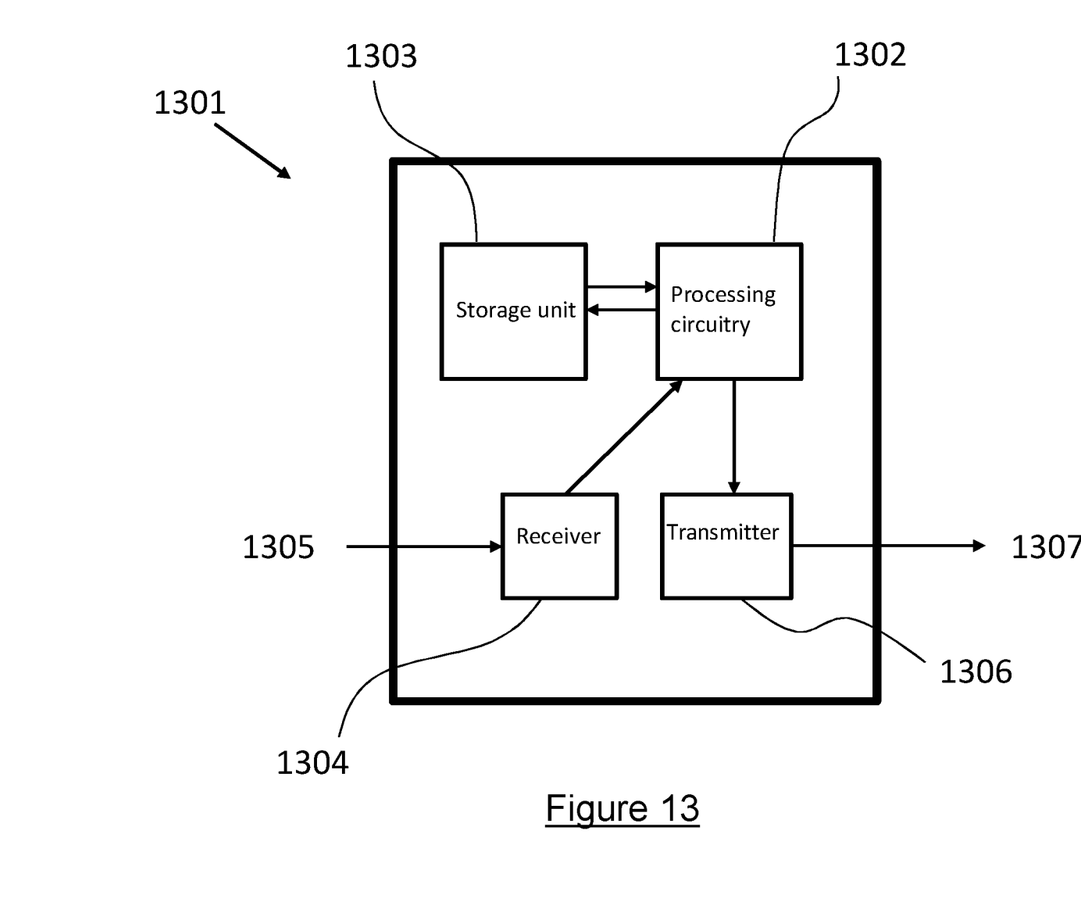
FIG. 13 is a schematic diagram of a Control Function apparatus.

FIG. 13 is a schematic diagram of an exemplary apparatus 1301 for carrying out the above-described methods. The apparatus 1301 comprises: processor circuitry 1302; a storage unit 1303 storing instructions executable by the processor circuitry 1302, a receiver 1304 for receiving messages 1305 and a transmitter 1306 for transmitting messages 1307.

The invention claimed is:

1. A method of securing media across an IP Multimedia Subsystem (IMS) network where the media transits via first and second media gateway functions of the IMS network, wherein the first and second media gateway functions are controlled by respective first and second media gateway controllers acting as back-to-back Session Initiation Protocol (SIP) user agents, the method comprising:
sending from the first media gateway controller (i) to the second media gateway controller or (ii) to a node upstream of the second media gateway controller, security information of the first media gateway function; and
using the sent information to secure media between the first and second media gateway functions or between the first media gateway function and said upstream node.

2. The method according to claim 1, the method further comprising:
the first media gateway controller receiving, from the second media gateway controller, further security information of the second media gateway function or said upstream node; and
the first media gateway controller using the further security information to secure media between the first and second media gateway functions or between the first media gateway function and said upstream node.

3. The method according to claim 2, the method further comprising using the security information and the further security information to negotiate one or more encryption keys and using one or more of the encryption keys to secure the media.

4. The method according to claim 3, wherein said one or more encryption keys are negotiated using a Session Description Security Descriptions (SDES) protocol or a Datagram Transport Layer Security (DTLS) protocol.

5. The method according to claim 2, wherein the further security information is included in a SIP 18x series or a SIP 200 response message.

6. The method according to claim 2, wherein the second media gateway controller receives from the first media gateway controller the security information of the first media gateway function and data indicating which of the second media gateway function or said upstream node should be sent the security information.

7. The method according to claim 6, the method further comprising the second media gateway controller obtaining the further security information from either the second media gateway function or said upstream node according to said data.

8. The method according to claim 1, the method further comprising:
the first media gateway function receiving media secured using the security information of the first media gateway from the second media gateway function or said upstream node; and
removing security from the received media.

9. The method according to claim 1, wherein the first media gateway controller and/or the second media gateway controller is a Proxy Call Session Control Function (P-CSCF), an Interconnection Border Control Function (IBCF), or a Media Gateway Control Function (MGCF).

10. The method according to claim 1, wherein
the security information of the first media gateway function is sent from the first media gateway controller to the node upstream of the second media gateway controller, and
the second media gateway controller is a Media Resource Function Controller (MRFC) and said upstream node is a Media Resource Function Processor (MRFP).

11. The method according to claim 1, wherein
the security information of the first media gateway function is sent from the first media gateway controller to the node upstream of the second media gateway controller, and
said upstream node is a User Equipment (UE).

12. The method according to claim 1, wherein the security information of the first media gateway function is included in a SIP INVITE or SIP UPDATE message.

13. An apparatus configured to operate as a first media gateway controller acting as a back-to-back Session Initiation Protocol (SIP) user agent controlling a first media gateway function of an IP Multimedia Subsystem (IMS) network, the apparatus comprising:
processor circuitry;
a storage unit storing instructions executable by the processor circuitry;
a receiver for receiving messages; and
a transmitter for sending messages, whereby the apparatus is operable to:
send security information of the first media gateway function (i) to a second media gateway controller acting as a back-to-back SIP user agent controlling a second media gateway function of the IMS network of (ii) to a node upstream of the second media gateway controller, and
configure the first media gateway function to remove security from media secured using the security information, wherein the media is received from the second media gateway function or the upstream node.

14. The apparatus according to claim 13, whereby the apparatus is operable to:
receive further security information of the second media gateway function or said upstream node, and
send the further security information to the first media gateway function, and configure the first media gateway function to secure media using the further security information for sending to the second media gateway function or said upstream node.

15. The apparatus according to claim 14, whereby the apparatus is operable to send the security information to the first media gateway function in response to receiving an 18x series answer containing the security information.

16. The method of claim 1, wherein
the security information of the first media gateway function is included in a message, and
the message includes an indicator indicating a need for encryption of core media.

17. An apparatus configured to operate as a first media gateway controller acting as a back-to-back Session Initiation Protocol (SIP) user agent controlling a first media gateway function of an IP Multimedia Subsystem (IMS) network, network, the apparatus comprising:
processor circuitry;
a storage unit storing instructions executable by the processor circuitry;
a receiver for receiving messages; and
a transmitter for sending messages, whereby the apparatus is operable to:
receive security information of a second media gateway function of the IMS network controlled by a second media gateway controller acting as a back-to-back SIP user agent;
send the security information to either the first media gateway function or to a node upstream of the first media gateway controller; and
configure the first media gateway function or a node upstream of the first media gateway controller to use the security information to secure media for sending to the second media gateway function.

18. The apparatus according to claim 17, whereby the apparatus is operable to send the security information in response to receiving a SIP INVITE or SIP UPDATE containing the security information.

19. The apparatus according to claim 17, whereby the apparatus is operable to:
receive an indicator specifying which of the first media gateway function or said upstream node to send the security information; and
send the security information to the first media gateway function or said upstream node according to said indicator.

20. The apparatus according to claim 17, whereby the apparatus is operable to:
obtain security information from either the first media gateway function or the node upstream of the first media gateway controller according to an indicator; and
send the obtained security information to the second media gateway function.

21. The apparatus according to claim 13, wherein the apparatus is configured to operate as a Proxy Call Session Control Function (P-CSCF), an Interconnection Border Control Function (IBCF), a Media Resource Function Controller (MRFC), or a Media Gateway Control Function (MGCF).

* * * * *